(12) United States Patent
Waites

(10) Patent No.: US 8,670,078 B2
(45) Date of Patent: Mar. 11, 2014

(54) TWO-SIDED REMOTE CONTROL

(75) Inventor: Nigel Waites, Lakeville, MN (US)

(73) Assignee: BBY Solutions, Richfield, MN (US)

( * ) Notice: Subject to any disclaimer, the term of this patent is extended or adjusted under 35 U.S.C. 154(b) by 0 days.

(21) Appl. No.: 13/153,574

(22) Filed: Jun. 6, 2011

(65) Prior Publication Data

US 2012/0140117 A1  Jun. 7, 2012

Related U.S. Application Data

(60) Provisional application No. 61/406,727, filed on Oct. 26, 2010.

(51) Int. Cl.
*H04N 5/44* (2011.01)
*G08C 19/00* (2006.01)
*G05B 19/02* (2006.01)

(52) U.S. Cl.
USPC .................. 348/734; 340/12.54; 340/12.55

(58) Field of Classification Search
USPC .................. 348/734; 345/157, 158, 169, 173; 340/12.54, 12.55, 13.31, 13.32; D14/218
See application file for complete search history.

(56) References Cited

U.S. PATENT DOCUMENTS

| | | | | | |
|---|---|---|---|---|---|
| 4,925,149 | A | * | 5/1990 | DiFrancesca et al. | 248/687 |
| 5,001,603 | A | * | 3/1991 | Villaneuva et al. | 361/730 |
| 5,299,685 | A | * | 4/1994 | Chin | 206/320 |
| 5,388,692 | A | * | 2/1995 | Withrow et al. | 206/320 |
| 6,464,197 | B1 | * | 10/2002 | Chen | 248/687 |
| 6,616,111 | B1 | * | 9/2003 | White | 248/309.1 |
| 6,636,606 | B1 | * | 10/2003 | Lissner et al. | 379/451 |
| 6,750,803 | B2 | * | 6/2004 | Yates et al. | 341/176 |
| 6,853,308 | B1 | * | 2/2005 | Dustin | 340/12.53 |
| 6,965,373 | B1 | * | 11/2005 | Clapper | 345/169 |
| 7,123,242 | B1 | * | 10/2006 | Henty | 345/169 |
| D644,521 | S | * | 9/2011 | Howell et al. | D9/521 |
| 2001/0035860 | A1 | * | 11/2001 | Segal et al. | 345/173 |
| 2003/0035074 | A1 | * | 2/2003 | Dubil et al. | 348/734 |
| 2003/0206394 | A1 | * | 11/2003 | Ossia | 361/680 |
| 2004/0148629 | A1 | * | 7/2004 | Shibamiya et al. | 725/53 |
| 2008/0005764 | A1 | * | 1/2008 | Arling et al. | 725/39 |
| 2009/0249402 | A1 | * | 10/2009 | Lee | 725/51 |
| 2010/0118209 | A1 | * | 5/2010 | Hardacker | 348/734 |
| 2010/0180306 | A1 | * | 7/2010 | Kim et al. | 725/47 |
| 2010/0271231 | A1 | * | 10/2010 | Gottlieb | 340/825.22 |
| 2010/0321249 | A1 | * | 12/2010 | Chiang et al. | 343/700 MS |

* cited by examiner

*Primary Examiner* — Victor Kostak
(74) *Attorney, Agent, or Firm* — Beck & Tysver PLLC

(57) ABSTRACT

A remote control is described that with at least two faces that have at least one touch-based input. The remote control also includes an orientation sensor that determines the orientation of the remote control. A processor on the remote ignores signals from inputs on certain faces of the remote based upon the orientation of the remote control.

20 Claims, 6 Drawing Sheets

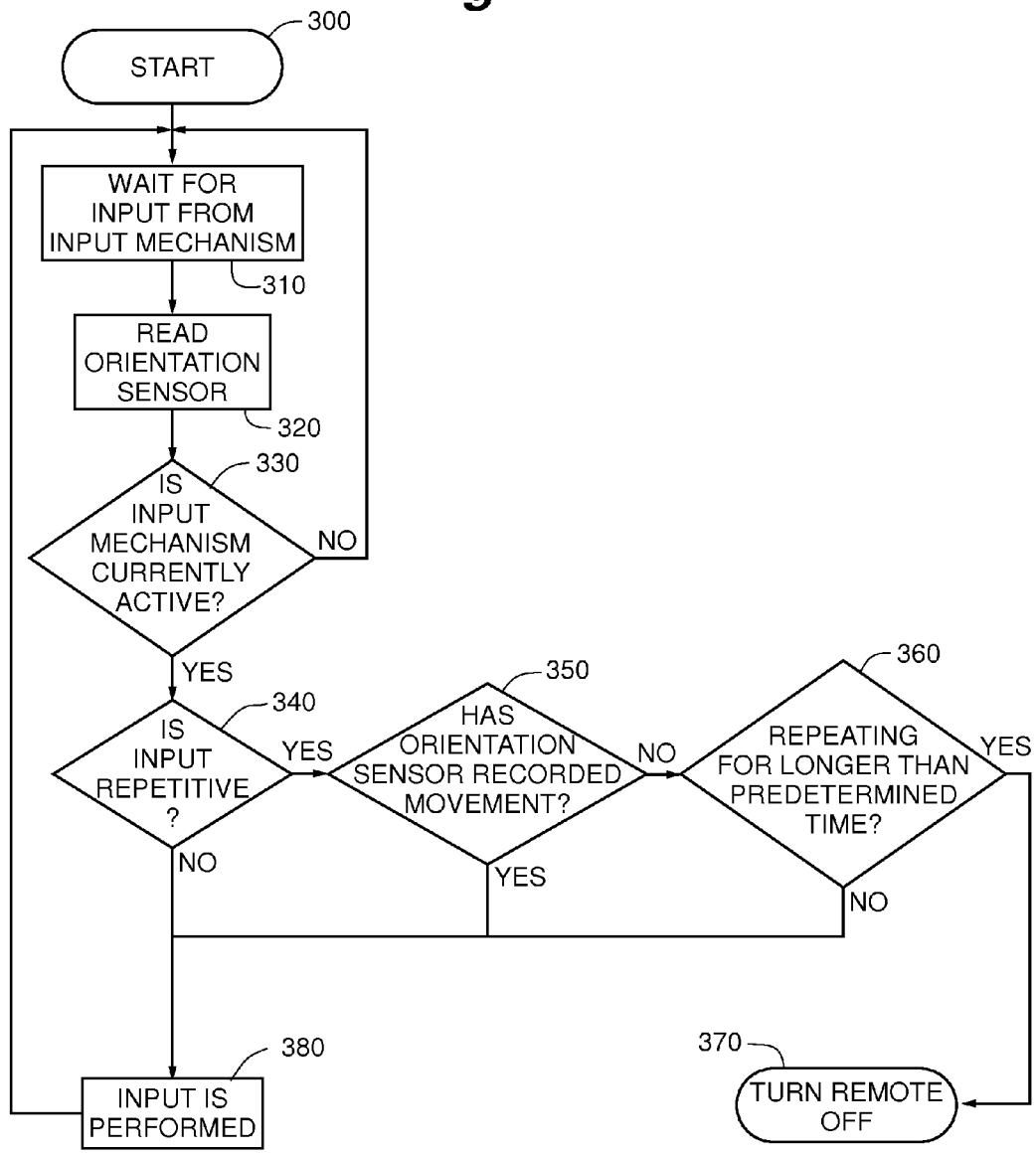

TWO-SIDED REMOTE CONTROL

FIELD OF THE INVENTION

The present application relates to the field of touch remote control devices for television and video devices. More particularly, the described embodiments relate to a remote control device that has two interface panels on opposite sides of the device, where the remote uses an orientation sensor to ignore signals from certain inputs based upon the orientation of the remote control.

BRIEF DESCRIPTION OF THE DRAWINGS

FIG. 7 is a flow chart showing the process used to implement an exemplary embodiment of the present invention

DETAILED DESCRIPTION

Figure 1:
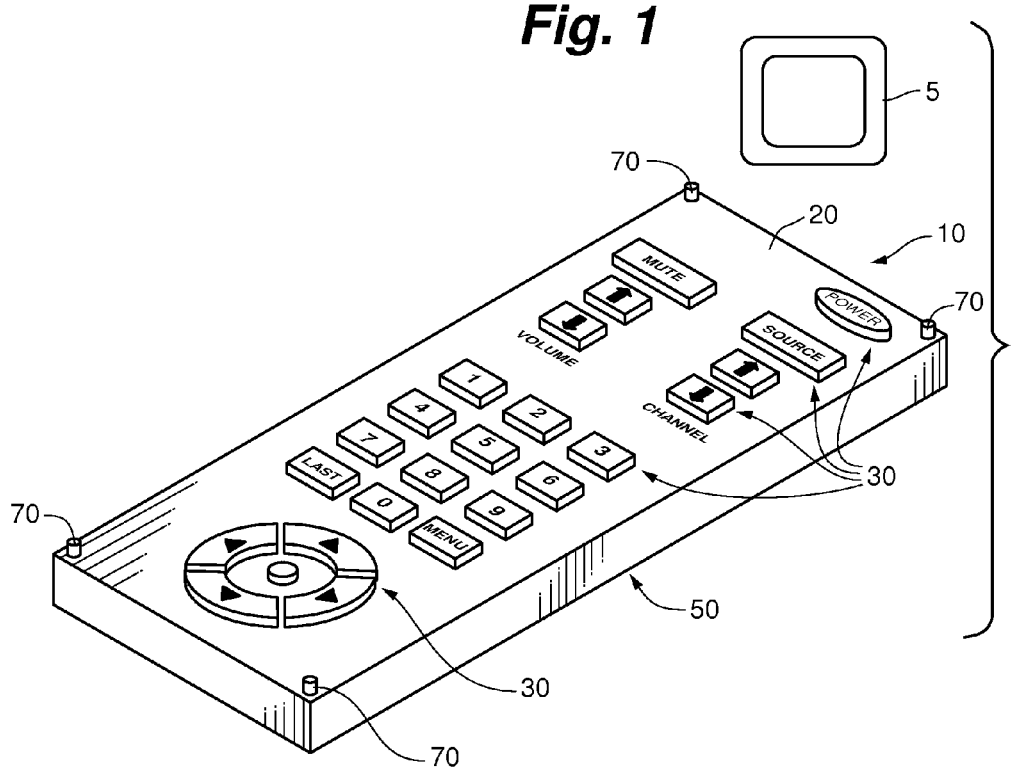
FIG. 1 is a perspective drawing of a first embodiment of the present invention showing a first face in the upward position.

FIG. 1 shows one embodiment of a remote control 10 with a first face 20 in an upright position. This first face 20 contains numerous buttons 30 that are used to interface with a television or other video device 5, which is shown significantly smaller than the remote 10 in FIG. 1 to indicate that the device 5 is located remotely from the remote 10. The video device 5 may be a television, a video display monitor, a projection monitor, or some other device capable of displaying a video signal. The remote control 10 may control the video device 5 directly. Alternatively, the remote control 10 may control a device that provides a video signal or source to the television or monitor, which in turn displays the video signal. For example, the remote control 10 may control a cable or satellite television set-top-box, a streaming video network device as a Roku DVP device from Roku (Saratoga, Calif.) or an Apple TV device from Apple Inc. (Cupertino, Calif.), or even a media computer. For purposes of this disclosure, the devices that are controlled by the remote control are referred to as a television or a video or display device. Such references should be read to include devices containing the actual display technology as well as devices that provide video signals to such devices.

The buttons 30 may include power, source, volume, channel up/down, a ten-key pad, and other standard buttons 30 found in typical remote controls of the prior art. The buttons 30 shown in FIG. 1 also includes a menu button, and a four-way direction pad and selection button that allows the remote control to control a GUI interface or menu system on the television 5.

Figure 2:
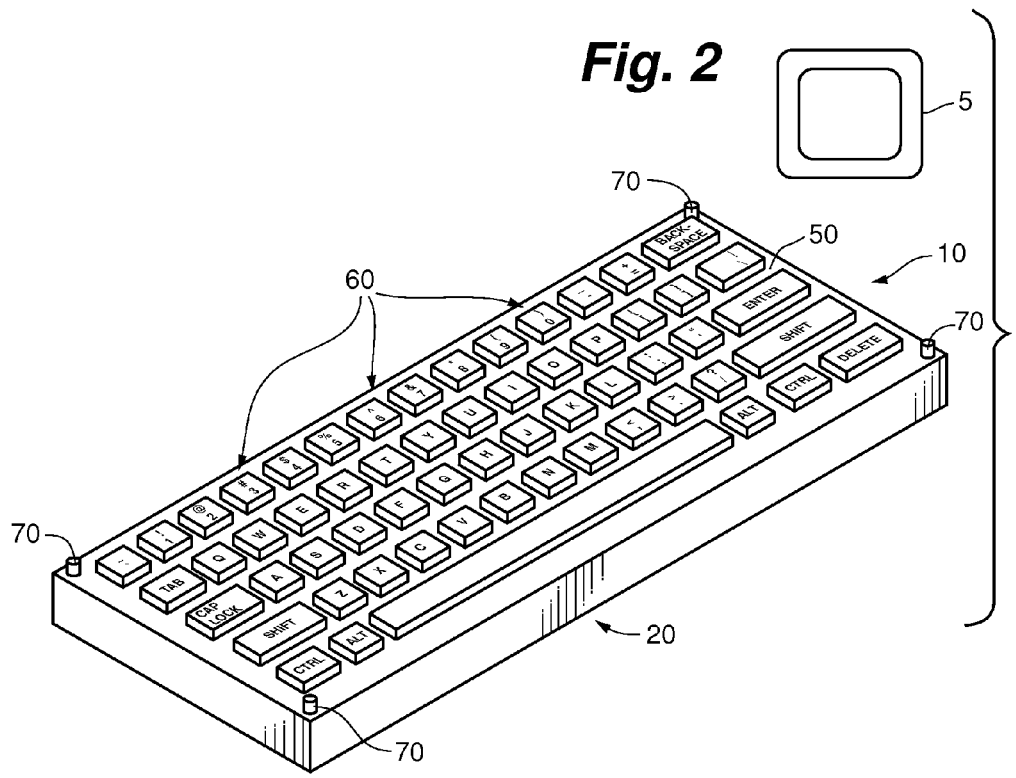
FIG. 2 is a perspective drawing of the first embodiment of the present invention showing a second face in the upward position.

As shown in FIG. 2, the remote 10 also has a second face 50 that is located on the side of the remote 10 that is opposite the first face 20. Like the first face 20, the second face 50 also contains a plurality of buttons 60 that send signals to the television or video device 5. In the embodiment shown in FIG. 2, the second face 50 contains a plurality of letter buttons in a QWERTY configuration to allow the user to input text to the television 5. The keyboard layout shown in FIG. 2 is merely exemplary, and other arrangements of keys for the reverse face 50 would be within the scope of the present invention. For instance, the QWERTY keyboard layout could be retained for letters, with the numeric keys being arranged in a 10-key layout to the right or left of the letter keys. In addition, some keys could be located on both the top face 20 and the bottom face 50 of the keyboard, such as the four-way direction pad and selection button for interacting with a GUI on the television 5.

In FIGS. 1 and 2, both faces 20, 50 are shown with a plurality of buttons 30, 60. The term button indicates an element on the face 20, 50 that is touched or pushed by a user to provide input to the remote. The buttons 30, 60 shown in FIGS. 1 and 2 are physical push buttons that move physically with respect to faces 20, 50 when pushed. Most push buttons 30, 60 provide input using a simple switch mechanism where a switch is opened or closed by the physical translation of the button with respect to the device on which the button is mounted. Other types of buttons are possible, including buttons where pressure on or contact with the button is noted without requiring any physical movement of the button.

The advantage of having a remote with opposite faces 20, 50 both having input buttons is that it is possible to place more physical buttons on a single remote without either increasing the size of the remote or requiring the added complexity and weight of a slide-out keyboard. In the embodiment 10 shown in FIGS. 1 and 2, the remote contains standard buttons on face 20, and a fully QWERTY keyboard on face 50. If the user were merely interested in controlling source, channel, or volume of the television set 5, they would hold the remote so that face 20 was upwards and then use the buttons 30 found on this face 20. When the display 5 showed an interface to a user that required textual input, the user would simply turn the remote 10 over so that face 50 was upwards. In this configuration, as shown in FIG. 2, the letter keys 60 would be facing upwards and the user could enter any text necessary simply by pressing the appropriate button on the remote 60. Other solutions to text input in televisions and similar displays 50 require interaction with an onscreen keyboard, multiple button pushes of numeric buttons on a ten-key pad (with multiple letters sharing a single key for input), the use of a slide-out keyboard tray, or the use of a keyboard that is separate from the remote. The solution shown in FIGS. 1 and 2 allows the remote 10 to a have separate key for each letter, eliminates the need for a separate keyboard, and reduces the size of the remote by grouping related keys on opposite faces of the same remote without the need for a slide-out component.

While holding the remote 10 with either face 20 or face 50 in the upwards position, it is possible, and perhaps likely, that the user will accidently press a button found on the downward facing face 50, 20 of the remote. To prevent these accidental button pushes from registering as actual commands to the display/television 5, the remote 10 incorporates one or more position or orientation sensors, such as accelerometers or gyroscopic sensors, to detect which face 20, 50 is currently upwards. One accelerometer that could be used to provide the functionality is model number LIS331DLH, a 3-axis smart motion sensor from STMicroelectronics (Geneva, Switzerland). An example gyroscopic sensor would be a microelectromechanical system (or "MEMS") gyroscope such as the L3G4200DH digital gyroscope also sold by STMicroelectronics. The combination of a 3-axis accelerometer and gyroscope would allow the remote 10 to have more detailed knowledge of its current position and orientation than either sensor acting alone. While such knowledge would be useful in programming advance features for the remote (such as game play or tilt interaction), the minimum sensor configuration necessary to implement the upward/downward determination needed to disable certain keys is a single axis accelerometer. For ease in description, the one or more accelerometer or gyroscopic sensors used in the remote 10 will be referred to collectively as the orientation sensor. In addition, one skilled in the art would appreciate that future improvements made to art of orientation sensors could be applied to the remote 10.

With the aid of its orientation sensor(s), the remote 10 is able to identify when face 20 is upwards facing, and therefore deactivate the buttons 60 found on the reverse face 50 of the remote. In other words, commands issued from the buttons 60 are blocked (not sent by the remote) when face 20 is upwards facing. Similarly, when the remote 10 is held with face 50 upright as is shown in FIG. 2, this position would be sensed by the orientation sensor and the remote 10 would deactivate the buttons 30 on face 20. One way to block or deactivate the buttons is to simply power down the buttons 30, 60 that are currently being blocked.

In one embodiment, the remote 10 would also include corner stand elements 70 on one or both of the faces 20, 50. These elements 70, shown in FIGS. 1 and 2 at all four corners of both face 20 and face 50, allow the remote 10 to rest on a table or other flat surface without impacting the buttons 30 or 60 located on the downward facing side 20, 50. Instead, the remote 10 will rest on the four corner stand elements 70, which extend above their respective faces 20, 50 so as to be taller than any of the active buttons 30, 60 on that face 20, 50. The corner elements 70 will not prevent accidental pressing of the buttons 30, 60 on the downward face 20, 50 when the remote 10 is held in the hand, nor will it be of assistance if the remote 10 is placed on an uneven surface. In these circumstances, the use of the orientation sensor will prevent inadvertent inputs. Nonetheless, the corner elements 70 could both aid in reassuring users, and to provide a more stable rest for the remote 10, such as when the user is using the QWERTY keyboard 60 when the remote 10 is resting on a table. In one embodiment, the corner elements 70 are found on all four corners of at least one of the faces 20, 50, and preferably are formed of generally resilient material such as rubber. In other embodiments, no corner elements 70 are used on either surface 20, 50 of the remote.

Figure 3:
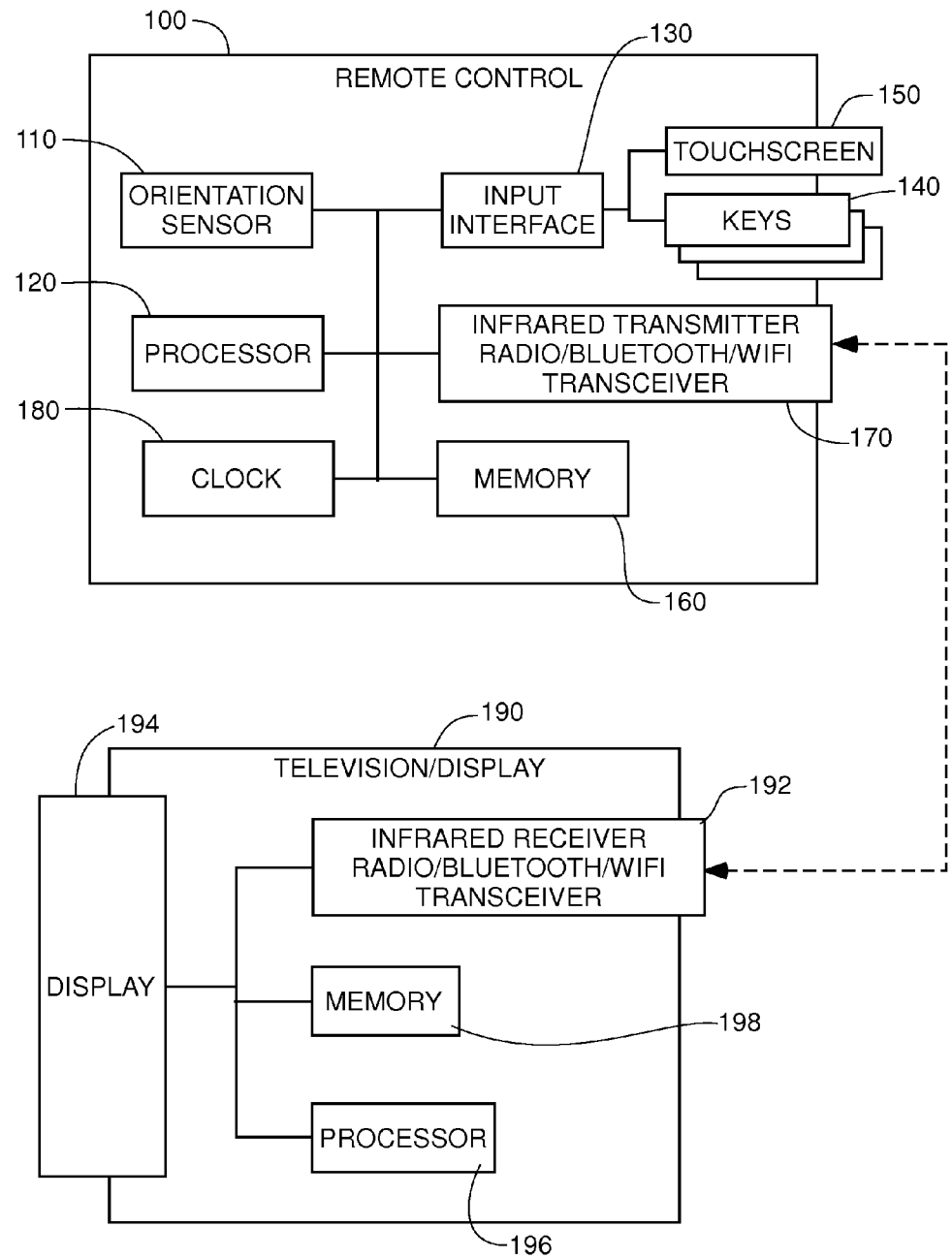
FIG. 3 is a schematic view of the major components of an embodiment of the present invention.

FIG. 3 schematically shows the elements of one embodiment of a remote control 100 implementing the present invention. The remote 100 includes one or more orientation sensors 110 that determine the orientation of the remote 100, such as a single or multi-axis accelerometer or gyroscope as described above. The orientation sensor 110 is monitored by a processor 120 to manage inputs to the remote 100. In one embodiment, the inputs are received through input interface 130. In most cases, the inputs will be received by a user interacting with a touch-based interface on the surface of the remote 100. For example, the input interface 130 may receive input signals from one or more keys 140, such as the buttons 30, 60 shown in FIGS. 1 and 2. In addition, the input processor 130 could receive touch-based input through a LCD touchscreen 150. The implementation of a touchscreen 150 on the remote 100 could be advantageous as the processor 120 could provide output useful to the user on the touchscreen's display, or could even implement a virtual key arrangement on the display, as shown below in connection with FIGS. 4-5. Other types of touch input could be implemented on remote 100, such as a touchpad/trackpad, a rotating ball, a pointing stick, etc. These inputs could be used to select items on the remote screen or move a cursor on the controlled display 190. Furthermore, a touchpad could be used to allow a user to provide direct input into the remote 100. For instance, gestures made by tracing a finger over the touchpad could be interpreted by the remote 100 as commands to the remote 100 or television 190. Alternatively, a user could draw letters or numbers on the touchpad, allowing the remote to receive alphanumeric characters without requiring a physical or virtual keyboard. Touchpads, trackpads, and touchscreens can all be considered as types of touch-sensitive surfaces.

In FIG. 3, a single input interface is shown connecting with both physical keys 140 and a touchscreen 150. In most implementations, however, each type of input would be associated with a separate input controller specialized for that type of input. A single input processor 130 is used in FIG. 3 for ease in understanding this embodiment of the invention.

The physical inputs 140, 150 are located on at least two faces or sides of the remote 100. Using programming found in a memory 160 on the remote 100, the processor 120 is able to use the position of the remote 100 as determined by the orientation sensor 110 in order to selectively activate and deactivate some of the inputs 140, 150. In the embodiment shown in FIGS. 1 and 2, the orientation sensor 110 would identify to the processor whether the first face 20 or the second face 50 is currently in the upright position. Based on this information, the processor can selectively activate and deactivate the first set of the keys 30 or the second of keys 60.

When input is received by the input interface 130 from an active input mechanism 140, 150, the processor 120 forwards that input choice to a transceiver device 170 for communication with a remote television or display, such as television 190. The transceiver 170 could incorporate an infrared transmitter, transmitting infrared light signals to the remote device 190. Alternatively, the transceiver 170 could send radio frequency signals to the device in the same manner as known RF remote controls. These control signals can be formatted according to a proprietary signaling protocol, or according to standard radio frequency signaling protocols such as Bluetooth. Because more and more televisions and displays are themselves network connected using WiFi protocols (using IEEE 802.11 networking standards), the transceiver 170 could also communicate with the television 190 using those same WiFi protocols. By so doing, the remote 100 could engage in complex, two-way communications with the television, so as to add additional functionality to the remote. The remote 100 may even take advantage of the WiFi transceiver 170 to establish a separate network connection to the Internet, allowing direct wide area network communications from the remote 100 without passing such communications through the television 190. Such Internet connections could be used to maintain and update the remote, could allow for interactive communications with the Internet by the user using only the remote, and could even allow for the downloading of separate "Apps" to increase the functionality of the remote. In one embodiment, the remote includes an infrared transmitter, a radio frequency transmitter (using standard RF remote frequencies), and a WiFi interface. This gives the remote 100 maximum flexibility in interacting with a variety of devices— direct control of the remote television or display can take place via IR or RF commands without the need for a WiFi router to manage a wireless network, while more complicated interactions can be accomplished over WiFi when that network is available.

Because the remote 100 has inputs on multiple surfaces, it is important to ensure that signals received from inputs 140, 150 are actually desired. As explained above, the orientation sensor 110 can be used to deactivate those touch inputs 140, 150 that are downward facing at any particular moment. The embodiment shown in FIG. 3 also utilizes a clock 180 to implement a time-out mechanism. If the remote 100, for instance, is lodged between cushions in a chair, unintended touch inputs at 140, 150 might be registered by the remote 100 even though those inputs 140, 150 are in a generally upright position. The processor uses the clock 180 to determine whether the orientation sensor 110 has recorded any significant movement in the remote 100 over a preset time interval. If not, and the input processor 130 has been signaling a repeating input at a single key 140 or a single location on the touchscreen 150, the processor can either ignore these inputs or, if so desired, power down the remote 100 to avoid battery drain issues. In one embodiment, the remote 100 will power down only after some indication is provided to the user that the remote 100 will soon turn itself off. This signal may be visibly presented on a display embedded in the remote (such as touchscreen 150), or audibly presented through a tone or other warning noise that is output through a speaker or vibration device (not shown). The user could then avoid the power down event by discontinuing the repeating input or by moving the remote 100 so that movement is sensed by orientation sensor 110.

Television 190 receives inputs from the remote 100 and transmits data and instructions to the remote through its own infrared/radio/WiFi transceiver 192. The television uses this input to control what is shown on its display 194, which may be a cathode ray tube, LCD, plasma display, projection display, or some other display technology. The inputs from the remote 100 are analyzed by processor 196 operating under instructions of programming stored in a memory device 198.

The instructions that control the processors 120, 196 of the remote 100 and television 190 are stored in memory devices 160, 198. These memories 160, 198 may comprise tangible, non-transitory, updateable memory devices such as flash memory, or could be stored in a less flexible, read only memory device. In one embodiment, both memories 160, 196 constitute solid state, non-transitory flash memory devices. The instructions may be executed directly from the non-transitory memory, or may be first loaded into RAM for faster processing. The processors 120, 196 may take the form of general purpose CPUs, such as those provided by Intel Corporation (Santa Clara, Calif.), Advanced Micro Devices, Inc. (Sunnyvale, Calif.), or ARM Holdings (Cambridge, England). Alternatively, the processor and instructions could be combined in the form of a programmable logic device specially programmed to perform the functions of the remote 100 or the television 190. In effect, a programmable logic device would contain both the processor 120, 196 and the memory 160, 198 containing the instructions for the processor 120, 196.

Figure 4:
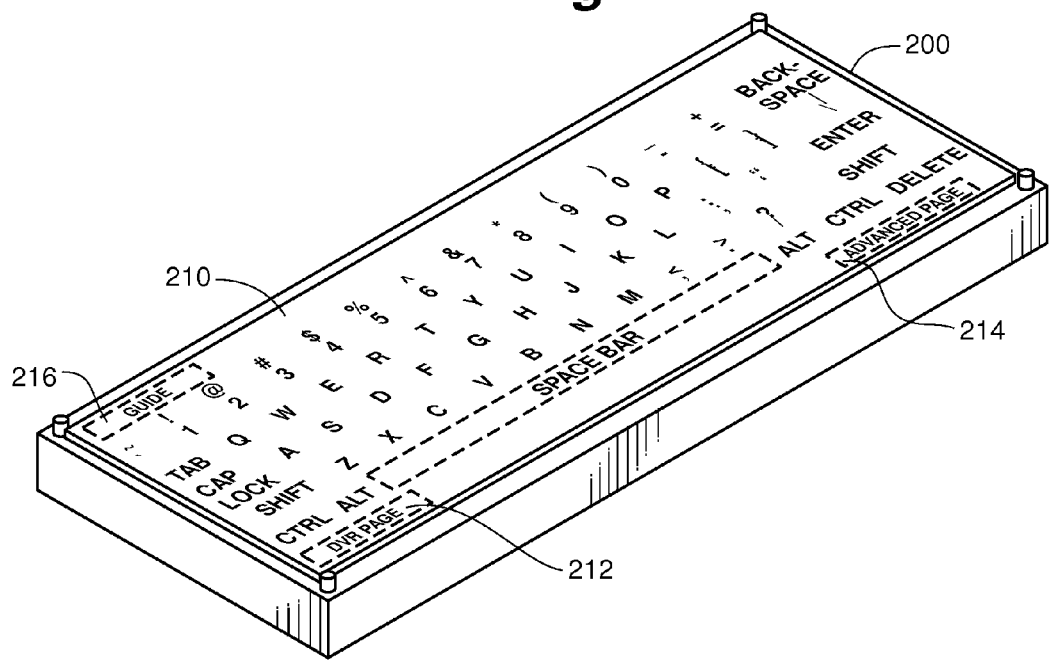
FIG. 4 is a perspective drawing of a second embodiment of the present invention showing a virtual keypad on its second face.

Another embodiment of the present invention is the remote control 200 shown in FIG. 4. In this figure, the entire QWERTY keyboard of FIG. 2 is replaced with a single display touchscreen 210. This touchscreen could use a variety of touchscreen technologies known in the prior art, including capacitive LCD touchscreen technology as is commonly used on cellular smart phones. In FIG. 4, the touchscreen 210 displays an image of the QWERTY keypad. A user can input any letter on the keypad simply by touching on the desired letter. When the remote 200 is held with the top face upright, the touchscreen 210 on the bottom of the remote 200 remains inactive. When the user desires to use the touchscreen input 210, the remote 200 is oriented so that the bottom face is generally upright. In this position, the touchscreen 210 is active.

One of the primary benefits of the use of a touchscreen 210 is that the image shown on the touchscreen 210 can change during use of the remote 200. For example, while commonly used remote control buttons 30 are shown in FIG. 1, almost all television remotes at the present time include many additional buttons as well. For instance, buttons are frequently found on remote controls dedicated to selecting different source inputs, for picture-in-picture capabilities, for electronic program guide (EPG) interaction, for close captioning and subtitles, and for DVR capabilities (such as play, pause, reverse, fast forward). With a touchscreen found on a "bottom" face of a remote, the "top" face could present the user with a simplified interface using only the most frequently used buttons, such as shown in FIG. 1. The touchscreen could display all of the other buttons that may be needed only occasionally, either on a single screen or on multiple pages.

When using a remote with a touchscreen 210, the user can page through multiple screens of potential buttons as needed. In FIG. 4, the touchscreen has a first location 212 that, when pressed, will change the display of the touchscreen to show DVR related buttons. A second location 214 may convert the touchscreen to a page with advanced buttons, such as picture-in-picture buttons, or advanced color or audio modification buttons.

Figure 5:
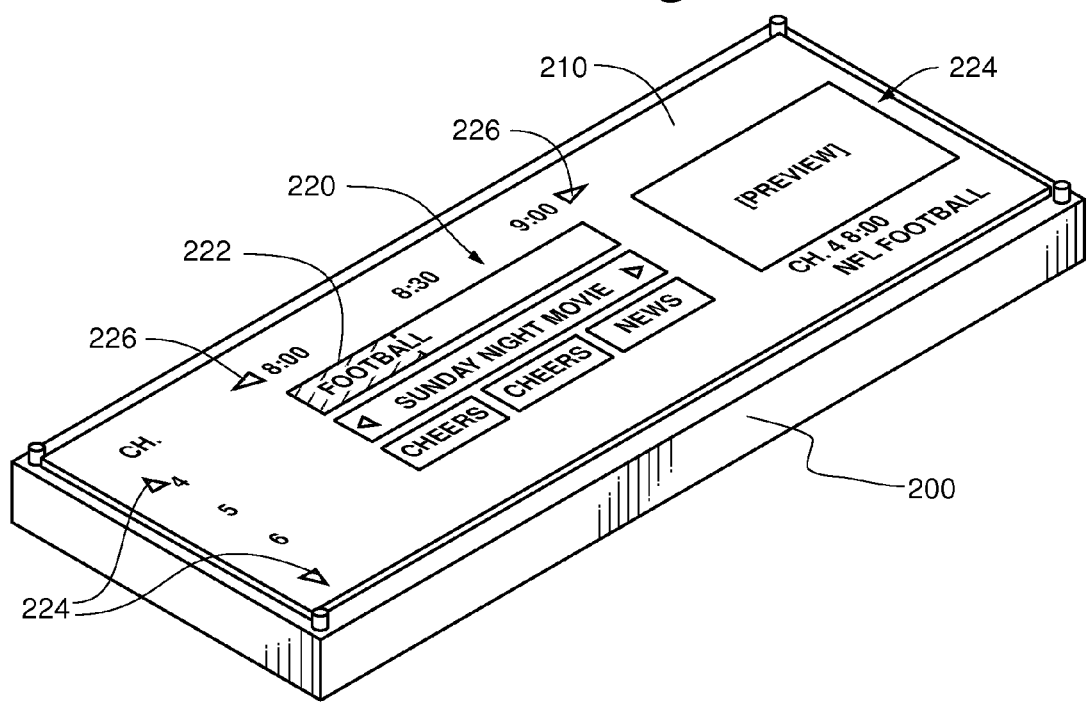
FIG. 5 is a perspective drawing of the second embodiment of the present invention showing an electronic programming guide on its second face.

A third location 216 initiates an electronic program guide, such as the EPG interface 220 shown in FIG. 5. The EPG interface has a standard grid configuration, with time changing along a left-to-right or x-axis and channels changing on an up-and-down or y-axis. Within the grid, the programming for the displayed channels at the displayed times is indicated. In EPG interface 220, a currently selected portion of the grid is darkened at location 222. This selected portion 222 indicates which programming is featured in the detail location 224 of the EPG interface 220. In this case, channel 4 at 8:00 is selected. Channel 4 shows NFL football at that time, so the detail area 224 provides information about that programming. This detailed information 224 may be a textual description, a video preview, or if the program is currently playing, a live view of the football game. In one embodiment, the television or display device provides the video preview by streaming video to the remote control for display within the EPG 220. Due to the size of the video displayed on the remote, only a low-resolution video stream is required for display on the remote 200.

The information for the EPG 220 is received by the remote control over the WiFi or radio frequency interface 170. In one embodiment, the television or display that is controlled by the remote 200 also transmits data to the remote 200. This data may be raw EPG data, where programming within the memory 160 of the remote 200 instructs the processor 120 how to construct the EPG interface 220 based upon this raw data. The processor 120 would allow the user to interact with the EPG interface, such as by pressing the up or down channel selectors 224, the change time-frame selectors 226, or by selecting a channel/time coordinate on the EPG grid. Such interaction would cause the processor 120 to alter the display based on the raw data received from the television. In fact, the remote control 200 may receive more information from the television than is displayed at one time, allowing the remote control to update the EPG grid without requiring any additional data from the television. In this embodiment, the remote is intelligent and is considered a "fat" or "thick" client of the television.

Alternatively, the television could produce the EPG interface 220 for the remote 200. In effect, the remote would receive information sufficient to create the display 220, and would forward inputs received on the touchscreen 210 back to the television for processing. A time change input on selector 226, for instance, would be submitted to the television, which would update the EPG grid and return the updated grid display to the remote 200 for display. In this embodiment, the remote 210 has sufficient intelligence to display the EPG interface and transmit inputs, but most of the intelligence for the EPG display is provided by the television. In effect, the remote 200 is a thin client of the television.

Whether the remote is a thick or thin client, user interaction with the remote is the same. Live video signals can be transmitted from the television to the remote for display on remote, thereby allowing a user to review programming currently showing on other channels without affecting the primary display of the television. This is all accomplished on a remote 200 with an up-facing and active touchscreen whose down-facing buttons or other user inputs are inactive.

Figure 6:
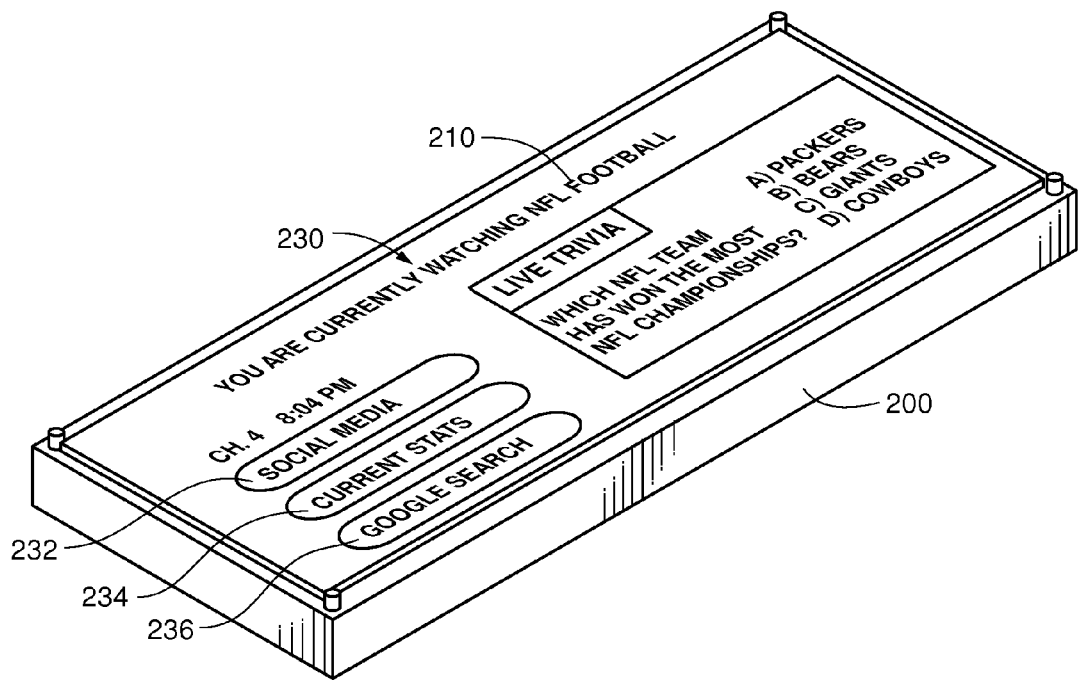
FIG. 6 is a perspective drawing of the second embodiment of the present invention showing an interactive, network based application running on its second face.

In addition to interacting directly with a television as a thick or thin client, the remote 200 is also able to directly access content and material on the Internet through its WiFi connection 170. FIG. 6 shows the touchscreen 210 on remote 200 displaying a "live trivia" contest 230. This material 230 is designed to relate to the material currently being watched on the television. Based on interaction between the television and the remote 200, the remote has knowledge of the channel and programming currently being viewed. The remote 200 has web access, and therefore is able to download and present interactive content relating to that programming. Alternatively, the television could use its knowledge of the currently displayed programming to feed appropriate content 230 to the remote.

In either case, the remote 200 displays the program currently being viewed, the current channel and time, and then presents relevant content 230. Interaction with the content can pass through the television as described above in connection with EPG 220. Alternatively, the remote can access the related content 230 directly through the Internet without any interaction with the television. The relevant content 230 can allow the user to access other related content as well. For instance, button 232 on the touchscreen 210 allows the user to access social media websites related to the content, such as a Facebook page or a social media page designed and controlled by the television content provider. Similarly, when the television content is a sporting event, button 234 allows a user to download and view current statistics for the event being viewed. The stats feature could allow the user to view scores and statistics relating to other sporting, or could even access a fantasy web site where a user could track the progress of their fantasy team on their remote 200 without altering the display of the television. In fact, it would even be possible to implement a full web browser and web search (such as through a Google search button 236) on the remote 200.

The method 300 for operating a remote control is shown in the flow chart shown in FIG. 7. The method 300 starts by waiting for input from one of the remote's input mechanisms at step 310. At step 320, the remote reads its orientation sensor to determine the current orientation of the remote, which is then used by step 330 to determine whether the input mechanism receiving the input is currently active. In most embodiments, input mechanisms located on a downward-directed face of the remote are inactive, while input mechanisms located on an upward-directed face are active. While this is expected to be the normal configuration, there is no reason that the remote could not be configured to allow some downward facing input mechanisms to remain active, or to deactivate some inputs that are upward facing.

If step 330 determines that the detected input was from an inactive input, the remote ignores the input and the method returns to step 310 to await the next input. If step 330 determines that the input was active, the method 300 next determines whether this is an inadvertent repeated input, such as an input caused by a remote being stuck between cushions on a couch. In this method 300, this is determined by examining whether the input is repetitive of an earlier input. To determine this, the remote might store one or more earlier inputs in its memory 160. If the input is the same as a previous or recent input, or if two or more inputs are alternating, this would be detected by the processor 120. If step 340 determines that the input is repetitive, step 350 determines whether the remote's orientation sensor detects any movement. Movement in the remote might indicate that a user is holding the remote and pressing one of the input buttons. Consequently, the method 300 may elect to allow all repeating inputs whenever the orientation sensor detects movement in the remote. This step 350 could be ignored in some embodiments in order to ensure that the remote handles all inadvertent, repeating inputs appropriately.

If the orientation sensor does not detect movement, step 360 will determine whether the repeating input has been received for longer than a preset time limit. Without this check, the remote might ignore repetitive inputs desired by the user, such as when a user changes channels by holding down one of the channel change buttons continuously. If step 360 decides that the repeating input has continued for longer than some pre-determined time interval (such as fifteen seconds), the remote ignores this input. In the preferred embodiment, the remote actually turns itself off at step 370, although it would be possible to simply ignore the input and return to waiting step 310. If step 360 determines that the repeating input has not exceeded the time limit, step 350 determines that the remote is currently in motion, or if step 340 determines that the input is not repeating, the input is performed at step 380. Performance of the input may be accomplished internally (such as by changing the display on the touchscreen 210), or externally (such as transmitting the command to a remote television or display). After the input is performed at step 380, the method returns to the waiting step 310.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A remote control for controlling a display device comprising:
   a) a plurality of input components that receive user input;
   b) a transmitter for transmitting signals to a remote display device; and
   c) a processor that:
      i) receives the user input from the plurality of input components,
      ii) determines the signals based on the user input,
      iii) instructs the transmitter to transmit the signals,
      iv) determines whether particular input received from a particular input component is a repeating input by comparing the particular input against previously received inputs, and
      v) prevents the repeating input from being transmitted to the remote display device.

2. The remote control of claim 1, further comprising:
d) a sensor sensitive to movement;
and wherein the processor further determines whether the particular input received from the particular input component is repeating input by determining a lack of movement of the remote control by analyzing the sensor.

3. The remote control of claim 2, wherein after repeating inputs are received for a time period after a last movement of the remote control that exceeds a preset limit, the processor powers down the remote control.

4. The remote control of claim 3, wherein the remote control provides a warning to a user that the remote control will soon power down before the processor powers down the remote control.

5. The remote control of claim 1, further comprising:
d) a clock,
wherein the processor determines whether the particular input received is repeating by waiting for the particular input to repeat for a predetermined time as determined by the clock.

6. The remote control of claim 5, wherein the processor determines whether the particular input received is repeating by determining that repeating inputs from at least two input components are alternating.

7. The remote control of claim 1, wherein the input components are physical push buttons that move physically with respect to other components of the remote control.

8. The remote control of claim 1, wherein the input components are locations on a touch screen.

9. A method for operating a remote control comprising:
a) receiving commands from a plurality of input components on the remote control;
b) determining whether each command is an accidental command by
i) determining whether the command is a repeating command, and
ii) determining whether the repeating command has been repeating for longer than a predetermined time period, and
c) transmitting signals from the remote control in response to commands that are not accidental commands; and
d) blocking the transmission of signals from the remote control in response to accidental commands.

10. The method of claim 9, wherein commands are repeating commands when a single command is repeatedly received from one input component.

11. The method of claim 9, further comprising:
e) powering down the remote control when accidental commands are received.

12. The method of claim 9, wherein the determining whether each command is an accidental command further comprises determining that the remote control has not undergone significant movement during the predetermined time period by analyzing a motion sensitive sensor on the remote control.

13. A remote control for controlling a display device comprising:
a) a first face being generally upwardly facing when the remote control is in a first position, the first face comprising:
i) a generally planar surface, and
ii) a plurality of physical push buttons that receive input by moving physically with respect to the planar surface of the first face;
b) a second face located on the remote control opposite the first face, the second face being generally upwardly facing when the remote control is in a second position, the second face comprising:
i) a display screen, and
ii) no physical push buttons that receive input by moving physically;
c) an orientation sensor able to distinguish when the remote control is held in the first and second positions;
d) a transmitter for transmitting signals; and
e) a processor that:
i) examines the orientation sensor to determine whether the remote control is in the first position or the second position,
ii) when the remote control is in the first position:
(1) transmits signals through the transmitter based on inputs received from the plurality of physical push buttons, and
(2) powers down the display screen, and
iii) when the remote control is in the second position:
(1) ignores inputs received from the plurality of physical push buttons, and
(2) powers the display screen to present information to a user.

14. The remote control of claim 13, wherein the generally planar surface of the first face is rectangular, wherein the plurality of physical push buttons extend by no more than a first distance above the generally planar surface of the first face, wherein the first face further comprises:
iii) four separate corner stand elements, each located proximal to a corner of the rectangular planar surface, the corner stand elements extending above the planar surface at a second distance greater than the first distance, such that, when the first face is laid down on a flat surface only the corner stand elements contact the flat surface and the plurality of physical push buttons does not contact the flat surface.

15. The remote control of claim 13, wherein the display screen is a touchscreen that receives a touchscreen input, wherein the processor ignores touchscreen inputs when the remote control is held in the first position and transmits signals through the transmitter based on the touchscreen inputs when the remote control is in the second position.

16. The remote control of claim 15, wherein the display screen shows an electronic program guide when the remote control is in the second position.

17. The remote control of claim 16, further comprising:
f) a Wi-Fi interface for communicating with a data network;
wherein the remote control receives electronic program guide information over the data network, further wherein touchscreen inputs relating to electronic program guide commands are transmitted by the transmitter to a video device.

18. The remote control of claim 13, further comprising a receiver for receiving a live video signal from a video device that receives signals from the transmitter, wherein the live video signal is programming available on the video device that is not currently displayed on the video device.

19. The remote control of claim 15, wherein the display screen shows a keyboard comprising twenty-six letters of the English Latin alphabet.

20. The remote control of claim 15, wherein the plurality of physical push buttons comprise a simplified interface without any advanced buttons selected from an advanced button set comprising picture-in-picture buttons, color modification buttons, and audio modification buttons; and wherein the touchscreen displays advanced buttons selected from the advanced button set.

* * * * *